June 2, 1970    W. B. HOFFLER ET AL    3,514,920
APPARATUS FOR OVERWRAPPING A PACKAGE
Filed April 17, 1968      5 Sheets-Sheet 1
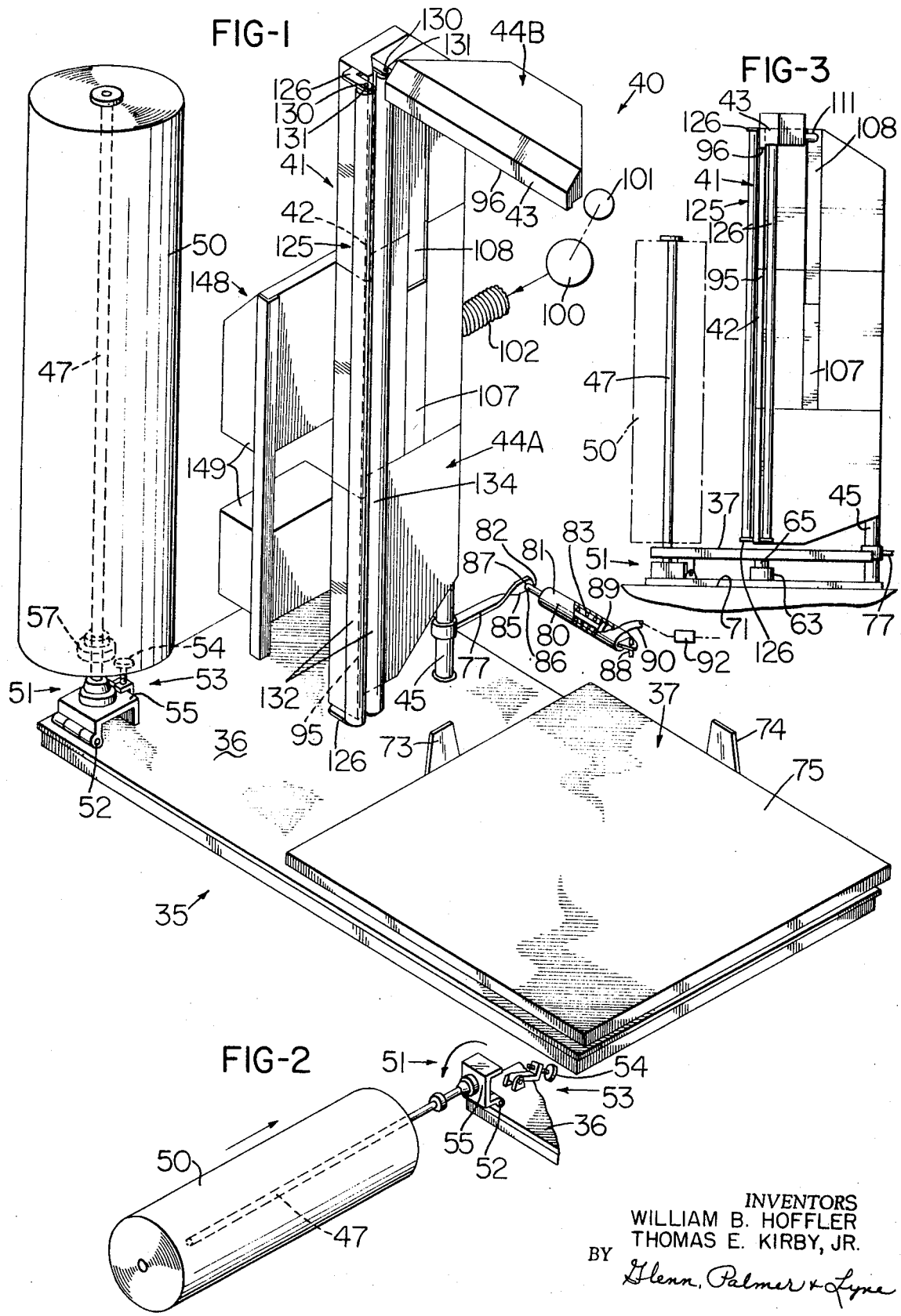
INVENTORS
WILLIAM B. HOFFLER
THOMAS E. KIRBY, JR.
BY
*Glenn, Palmer & Lyne*
THEIR ATTORNEYS

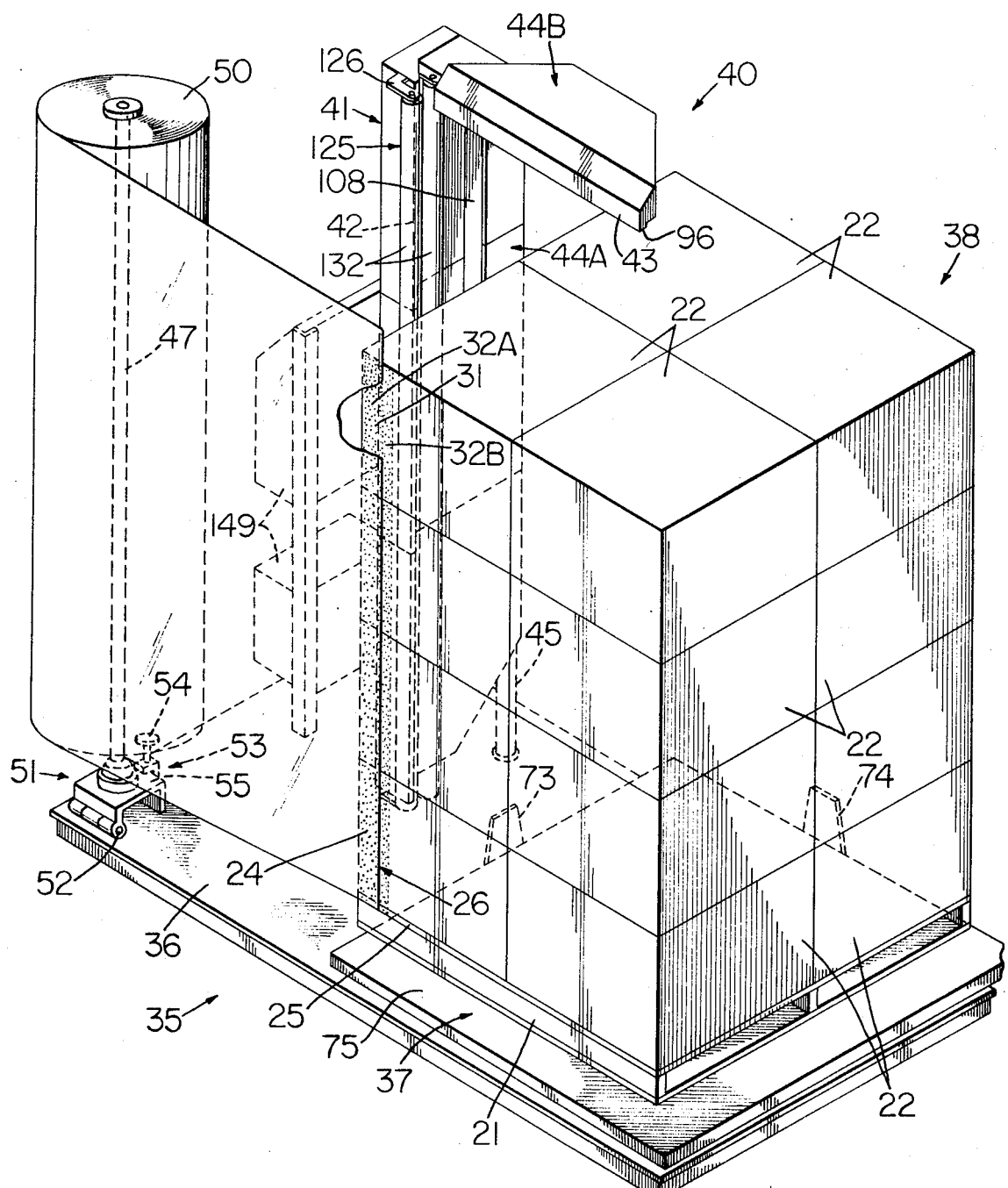

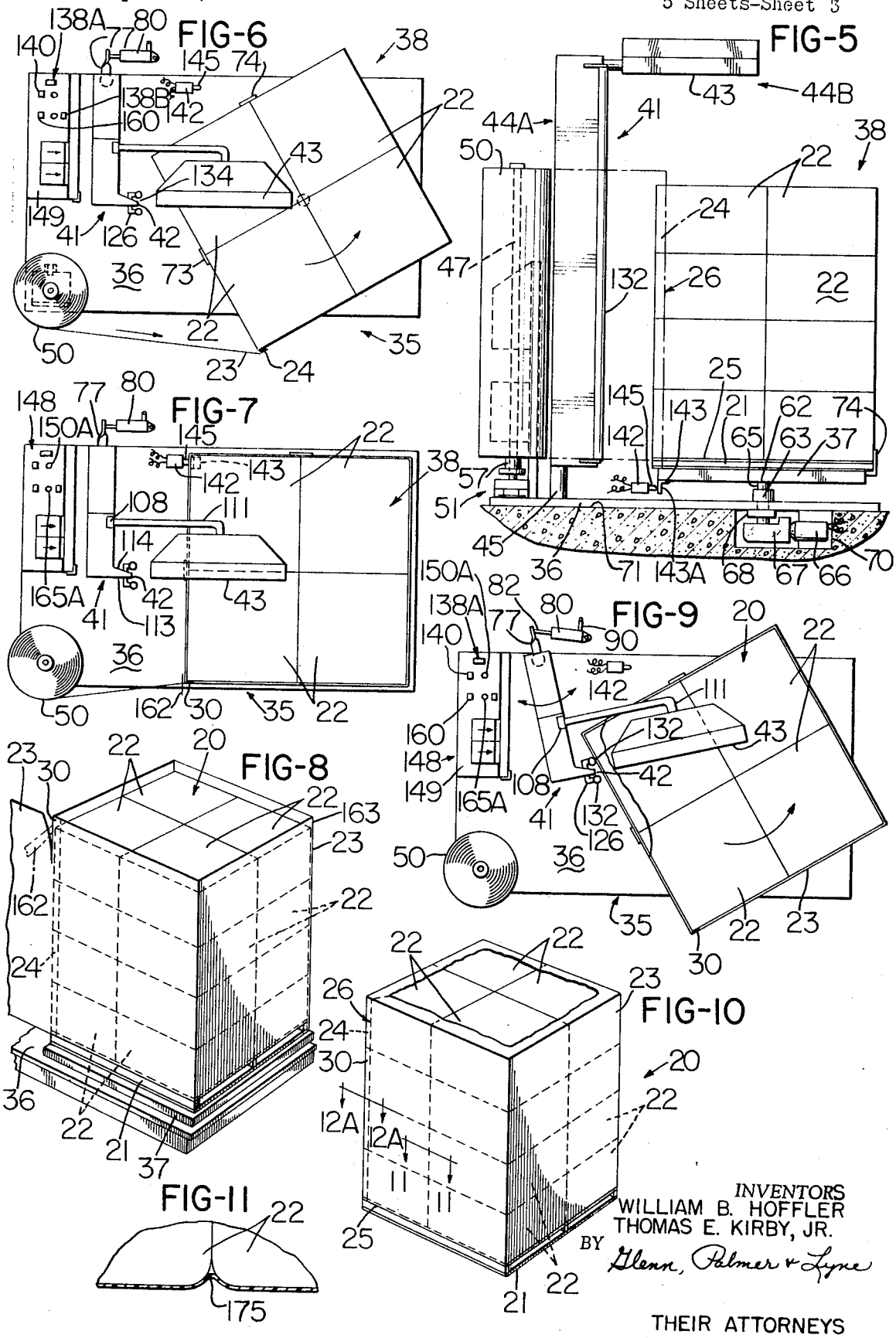

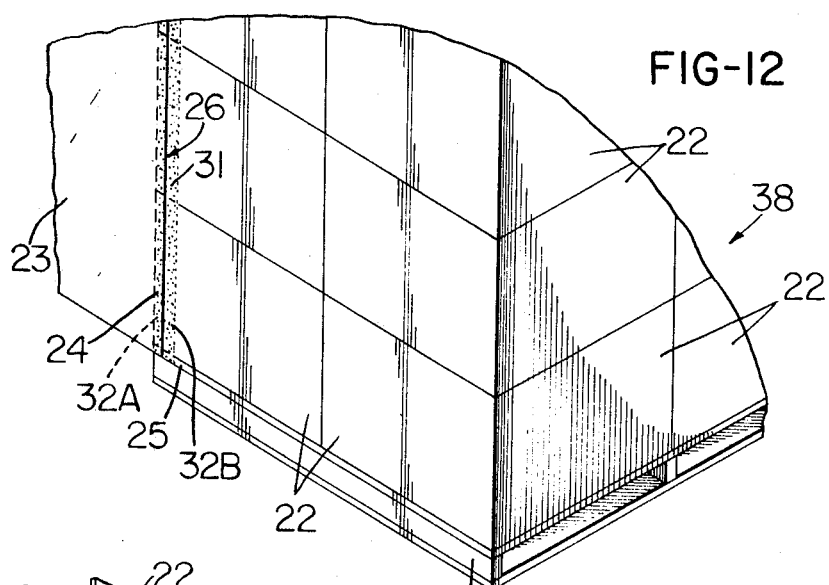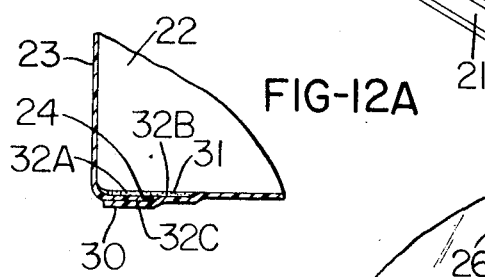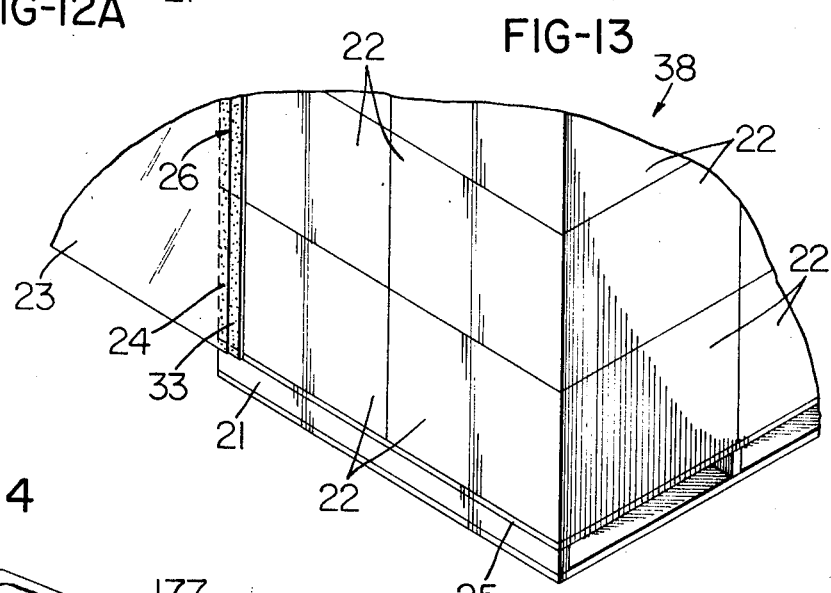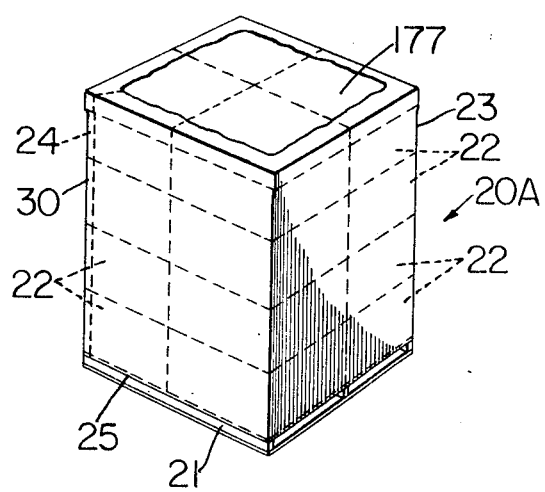

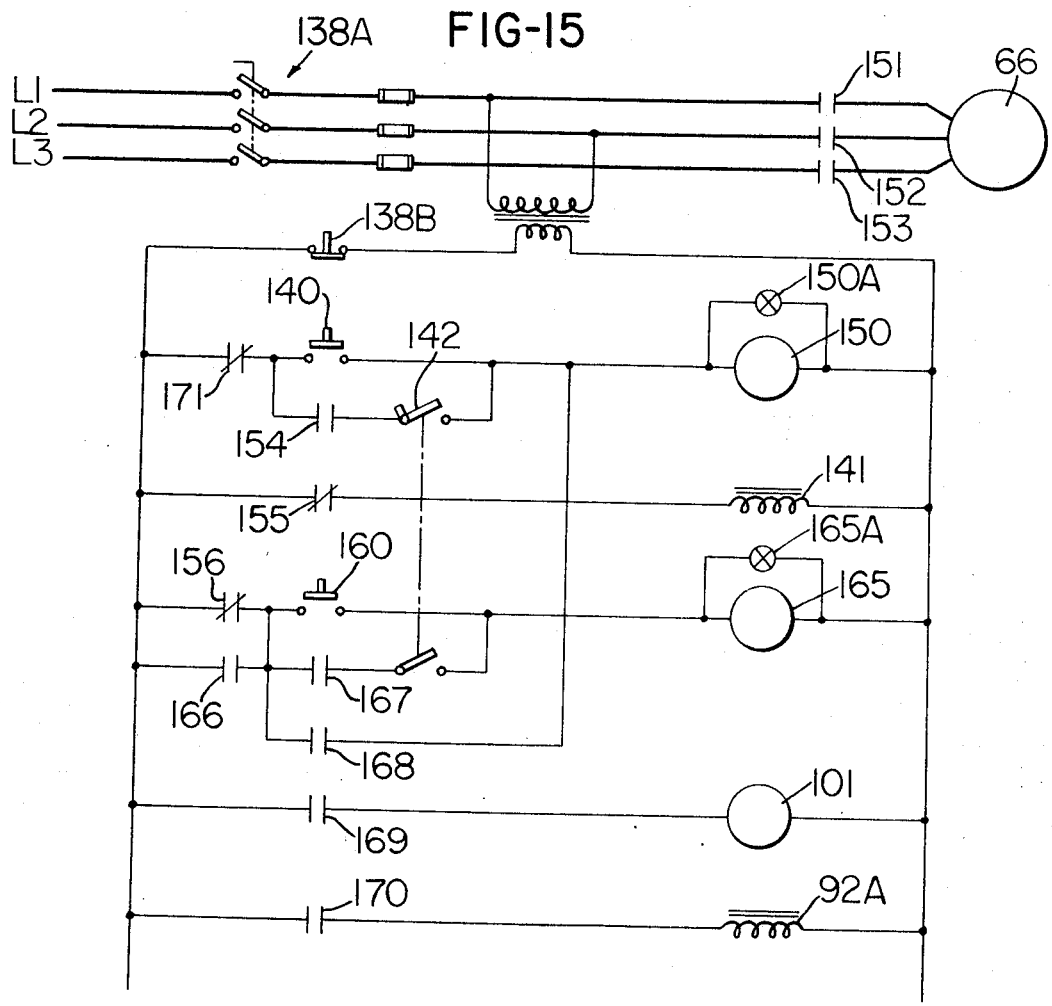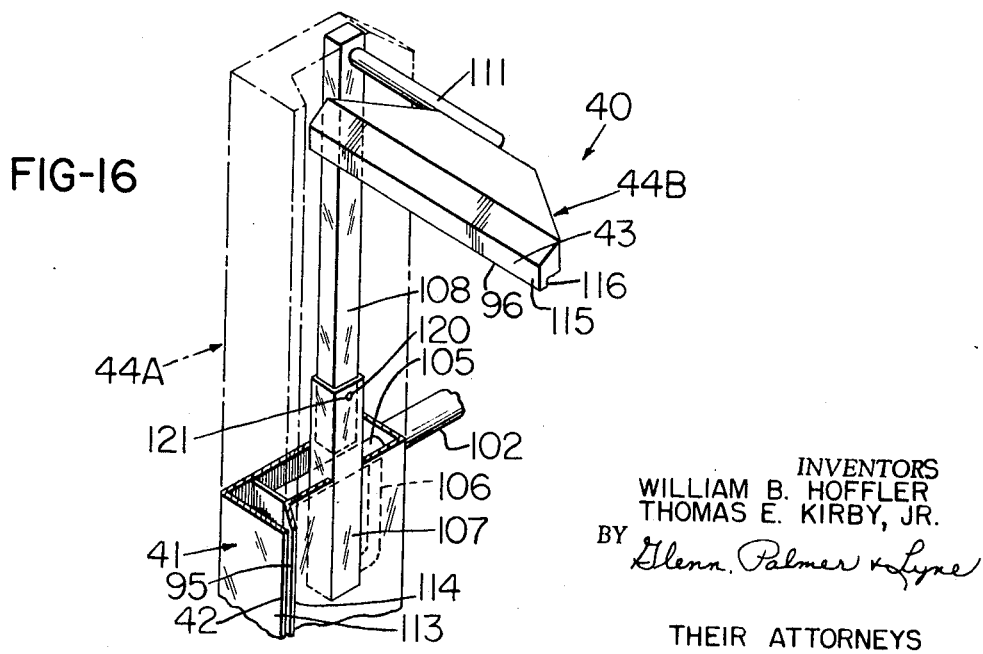

United States Patent Office 3,514,920
Patented June 2, 1970

3,514,920
APPARATUS FOR OVERWRAPPING A PACKAGE
William B. Hoffler, Henrico County, and Thomas E. Kirby, Jr., Chesterfield County, Va., assignors to Reynolds Metals Company, Richmond, Va., a corporation of Delaware
Filed Apr. 17, 1968, Ser. No. 722,010
Int. Cl. B65b 53/06, 11/48, 49/00
U.S. Cl. 53—64                                   16 Claims

ABSTRACT OF THE DISCLOSURE

This disclosure relates to an overwrapped package comprised of a pallet and one or more containers supported on such pallet and the pallet and containers have a film of plastic heat shrunk therearound to provide a unitary package which is easy to handle and transport. This disclosure also relates to an improved apparatus for and method of providing such a package.

BACKGROUND OF THE INVENTION

Many products are sold in cartons each containing a plurality of individually packaged items and each carton is generally sized so that it may be easily handled by one man. However, during the transportation, storage, and handling of such cartons they are generally supported on a pallet, or the like, to enable more efficient handling of a plurality of such cartons using suitable materials handling machinery and so as not to damage the cartons and their individual packages or containers. It has been found that the handling of cartons using existing techniques is time consuming, subjects the cartons to unnecessary handling, and results in considerable damage to the cartons and loss of the products contained therewithin.

In addition, presently known apparatus and methods of packaging are generally not acceptable in providing a package construction which enables a plurality of cartons to be packaged together with a pallet as a single unit to enable efficient transportation and handling thereof.

SUMMARY

This invention provides an improved overwrapped package comprised of a pallet and one or more individual containers or cartons supported on such pallet and held tightly together by an overwrapping material shrunk in position therearound so that the entire package may be handled as a single unit. Further, this invention provides an improved apparatus for and method of providing such an overwrapped package.

Other details, uses, and advantages of this invention will become apparent as the following description of the embodiments thereof presented in the accompanying drawings proceeds.

BRIEF DESCRIPTION OF THE DRAWINGS

The accompanying drawings show exemplary embodiments of this invention, in which FIG. 1 is a perspective view illustrating one exemplary embodiment of the apparatus of this invention utilized to provide an overwrapped package of this invention;

FIG. 2 is a fragmentary perspective view illustrating a spindle comprising the apparatus of FIG. 1 moved from its vertical to a horizontal position to enable a supply roll of plastic film used as an overwrapping material to be easily loaded thereon;

FIG. 3 is an end view of the apparatus of FIG. 1 with the supply roll of plastic film shown by dotted lines;

FIG. 4 is a perspective view illustrating the manner of supporting a pallet and a plurality of containers on a horizontally arranged rotatable platform of the apparatus of FIG. 1 and particularly illustrating the manner of attaching a leading edge of the plastic film against such pallet and containers to enable overwrapping thereof;

FIG. 5 is a front elevation of the apparatus of FIG. 1 particularly illustrating the drive for the rotatable platform;

FIG. 6 is a plan view illustrating the manner of overwrapping the pallet and its containers with plastic film after attaching the leading edge of such plastic film against the pallet and containers, such overwrapping being achieved merely by rotating the horizontal platform;

FIG. 7 is a plan view similar to FIG. 6 after the platform and its load have been rotated through one revolution and prior to cutting the roll of plastic film away from the overwrapped package;

FIG. 8 is a perspective view with parts broken away illustrating only the overwrapped package of FIG. 7 prior to cuting the plastic film;

FIG. 9 is a plan view similar to FIG. 6 illustrating the horizontal platform and its overwrapped package being rotated and illustrating a heating nozzle assembly comprising the apparatus of FIG. 1 urged toward the overwrapped package to heat shrink the plastic film therearound and provide a high-strength unitary package;

FIG. 10 is a perspective view illustrating the completed package with the plastic film shrunk in position therearound;

FIG. 11 is a fragmentary view taken on the line 11—11 of FIG. 10 particularly illustrating the manner in which the plastic film shrinks into the spaces between adjoining containers to urge and hold the containers tightly together;

FIG. 12 is an enlarged fragmentary perspective view particularly illustrating the manner of fastening the trailing edge portion of the plastic film used to overwrap the package of FIG. 8 against an adhesive applied on the pallet and its containers to hold the film in position and enable heat shrinking thereof;

FIG. 12A is an enlarged fragmentary cross-sectional view on the line 12A—12A of FIG. 10;

FIG. 13 is a perspective view similar to FIG. 12 wherein a double-faced pressure sensitive adhesive strip is used to enable easy fastening of the leading and trailing edge portions of an overwrapping film around a pallet and the containers supported thereby;

FIG. 14 is a perspective view illustrating another exemplary embodiment of an improved package of this invention which has a cover draped over the top containers prior to heat shrinking the plastic film against the package;

FIG. 15 schematically illustrates one exemplary embodiment of electrical circuitry that may be utilized to semiautomatically control the operation of the apparatus I FIG. 1; and FIG. 16 is a fragmentary perspective view particularly illustrating one way in which heated air may be supplied to the nozzle assembly of the apparatus of this invention and the manner in which a top nozzle comprising such nozzle assembly may be vertically adjusted.

DESCRIPTION OF ILLUSTRATED EMBODIMENTS

Reference is now made to FIG. 10 of the drawings wherein an exemplary overwrapped package of this invention is illustrated and designated generally by the reference numeral 20. The package 20 comprises a pallet 21 and container means shown as a plurality of containers or cartons 22 supported on the pallet 21. A shrinkable overwrapping material such as a heat-shrinkable transparent plastic film 23 is wrapped around the cartons 22 and the pallet 21 and such film is shrunk in position thereagainst to urge the cartons and pallet firmly together as a single unit which is easily and efficiently handled, transported, and stored without likelihood of damage thereto.

The heat-shrinkable plastic film 23 used as an overwrap for the package 20 has a substantially rectangular configuration and has a leading edge portion 24 fastened against the cartons 22 and the upper end portion 25 of the pallet 21 so that the leading edge 24 is arranged substantially vertically and as indicated by the reference numeral at 26. The film 23 has a trailing edge portion 30 which overlaps the leading edge portion 24 as illustrated in FIGS. 8 and 10 and may be adhesively fastened directly against portion 24 or to adhesive material, or the like, applied directly against the pallet 21 and cartons 22, whereupon the film 23 is heat-shrunk in position is a manner as will be described in detail subsequently to define the high-strength unitary package 20 illustrated in FIG. 10.

In the exemplary package 20 illustrated in FIGS. 10 and 12 the leading edge portion 24 of the film 23 may be easily fastened to the pallet 21 and cartons 22 along the vertical line 26 utilizing a suitable adhesive 31 which is applied on such pallet and cartons in an elongated substantially rectangular strip.

Thus, it will be seen that the leading edge portion 24 is adhesively fastened to the strip 31 as shown at 32A and the trailing edge portion 30 is adhesively fastened to the strip 31 at 32B. Further, it will be appreciated that upon heat sealing the film 23 in position the overlapped portions of film 23 indicated at 32C are heat sealed and more effectively held together, see FIG. 12A.

In some applications of this invention it may be desirable to replace the adhesive 31 with a separate elongated strip such as a double-faced pressure sensitive adhesive tape 33, see FIG. 13. The tape 33 is utilized to attach the leading edge 24 of the film 23 against the pallet 21 and cartons 22 and has its outer surface exposed so that upon overwrapping the trailing edge portion 30 of film 23 in pressure contact thereagainst the film 23 is adhesively fastened firmly in position. The pressure sensitive tape 33 may also be replaced by a wider and comparatively stiff elongated structural member such as an elongated strip of corrugated paperboard, or the like, and such paper may have adhesive applied against its outer surfaces to serve the same purpose as the adhesive on the double-faced pressure sensitive tape 33; yet, such strip of paperboard provides a firmer substantially planar nonyielding surface against which to attach both the leading edge portion 24 of the heat shrinkable film 23 and its trailing edge portion 30.

Having described the exemplary overwrapped package 20 in detail and one example of such package comprised of the pallet 21 and a plurality of cartons 22, a detailed description will now be made of one exemplary embodiment of an apparatus for and method of overwrapping package 20. To enable an easier presentation it should be understood that the reference made throughout this specification to package 20 may refer to such package either before or after the film 23 is heat shrunk in position.

Reference is now made to FIG. 1 of the drawings which illustrates an exemplary apparatus or wrapping machine of this invention which is designated generally by the reference numeral 35 and has a base portion 36 which supports most of the operating components. The apparatus 35 comprises a rotatable support or horizontal platform 37 which is adapted to support an associated assembly to be overwrapped. In this example of the invention the platform 37 is illustrated in certain of the views as supporting a package assembly comprised of pallet 21 and a plurality of cartons 22 to enable overwrapping thereof with heat-shrinkable plastic film 23 and for easy reference thereto such unwrapped assembly is designated generally by the reference numeral 38. Further, upon overwrapping the assembly 38 with plastic film 23 the resulting package is designated by the numeral 20, as previously explained, and the platform 37 is used to rotate package 20 to enable the film 23 to be heat shrunk in position.

The apparatus 35 has a device designated generally by the reference numeral at 40 which enables heating of the film 23 causing it to shrink against the package 20 comprised of pallet 21 and its cartons 22 to provide the unitary package 20 previously described in detail. The device 40 comprises a nozzle assembly 41 utilized to supply heated air to the overwrapped package 20 in a manner illustrated in FIG. 9 of the drawings and includes means for providing heated air to the assembly 41 as well as means for moving the assembly 41 toward and away from the package 20.

The nozzle assembly 41 includes a first nozzle 42 which is provided for supplying heated air along substantially the full vertical height of the package 20 and a second nozzle 43 provided for supplying heated air which is directed toward the top of the package 20. The nozzles 42 and 43 comprising the nozzle assembly 41 in this example are formed along associated peripheral edges of housing portions 44A and 44B respectively comprising the assembly 41.

The entire nozzle assembly 41 is pivotally mounted on the base portion 36 of the apparatus 35 by being fixed to a vertical shaft 45 which is supported on base portion 36 for free rotating or pivoting movement. The shaft 45 supports the nozzle assembly 41 in a cantilevered manner and upon rotating the vertical shaft 45 in a manner to be subsequently described it will be seen that the entire nozzle assembly 41 may be pivoted toward and away from the package 20.

The apparatus 35 has a spindle 47 for supporting a supply roll 50 of plastic film 23 for unwinding rotation thereabout. The spindle 47 is supported on the base 36 in spaced apart relation from the rotatable platform 37. The film 23 is easily unrolled from its supply roll 50 to enable the leading edge portion 24 of the film 23 to be attached to the assembly 38 whereupon the platform 37 is then rotated to simultaneously rotate the assembly 38 of pallet 21 and its cartons 22 and wrap the film 23 in a tubular form therearound. The force provided to unwind the film 23 from its supply roll 50 is provided solely by the rotation of the platform 37 and in the manner illustrated in the FIGS. 6 and 7 of the drawings as will be described in detail subsequently.

The spindle 47 is suitably fixed to a hinged support 51 which is supported for hinged movement with respect to the base portion 36 as shown at 52. A latch designated generally by the numeral 53 is provided for latching the hinged support 51 in position against base portion 36 of apparatus 35 and during normal operation of the apparatus 35 the latch is in the position illustrated in FIG. 1 and holds the hinged support 51 firmly against the base portion 36 to thereby hold the spindle 47 in a vertical position.

The spindle 47 is easily moved from its normally vertical to a substantially horizontal position by loosening a threaded member 54 comprising the latch 53, see FIG. 2 of the drawings. With the spindle 47 in a substantially horizontal position it is a simple matter to slide the supply roll 50 thereon whereupon the spindle 47 and the supply roll 50 is then pushed upwardly about the hinge 52 to the vertical position illustrated in FIG. 1 and the latch 53 is placed in latching position and support 51 is fastened to base portion 36 by tightening the threaded member 54 snugly against the top surface 55 of the support member 51. It will be appreciated that this feature enables easy loading and unloading of the supply roll 50 of the film 23 for use during operation of the apparatus 35.

The spindle 47 may have a suitable friction brake 57 suitably fixed thereto adjacent its lower end portion and the friction brake 57 is engaged by the lower end of the supply roll 50 and provides a predetermined and accurately controlled drag or resistance to rotation of the supply roll 50 as the film 23 is unwound therefrom. The friction brake 57 assures that the pallet 21 and its cartons 22 are comparatively tightly wrapped by the film 23 prior to heat shrinking such film in position therearound in a manner to be described in detail subsequently.

As seen particularly in FIG. 5 of the drawings the horizontal platform 37 is rotatable about a fixed vertical axis 62 and is supported for rotation on an antifriction bearing assembly 63 which supports the platform 37 on the base portion 36. The platform 37 has a drive in the form of a drive shaft 65 which is suitably fixed to its lower portion and which extends in an unobstructed manner through the bearing assembly 63. The drive shaft 65 is operatively connected to a drive motor shown as an electric drive motor 66 through a gear box 67 so that upon energizing the motor 66 the shaft 65 is rotated to rotate the horizontal platform 37. A brake 68 is also provided and such brake is used to stop rotation of the shaft 65 and hence platform 37 once the motor 66 is turned off. The operation of the brake 68 will be described in detail in connection with the description of the wrapping of the pallet 21 and cartons 22 with film 23 and the heat shrinking of such film.

In this exemplary embodiment of the invention the drive motor 66, gear box 67, and brake 68 are shown as being suitably supported in a recess 70 provided within a concrete floor 71 utilized to support the apparatus 35; however, it will be appreciated that such components may be arranged above the top surface of the floor 71 and may in some applications be mounted on other suitable supporting frame structure which may comprise the apparatus 35.

The horizontal platform 37 may also be provided with suitable stops shown as stops 73 and 74, and each stop may be adjustable along its associated side edge of the platform 37 in any suitable known manner. The stops 73 and 74 assure that the pallet 21 and its associated cartons 22 will not shift around on the horizontal platform 37 as the platform is rotated during the process of overwrapping the pallet 21 and cartons 22 with the film 23, as well as during the process of heat shrinking such film in position.

The top surface 75 of the platform 37 may be of any suitable construction and in this example of the invention is shown as a substantially planar surface. The surface 75 may be provided with suitable friction means such as an abrasive-like surface or a plurality of integral projections to prevent the pallet 21 from sliding around thereon. However, in some applications of this invention, it may be preferred to make the surface 75 as an antifriction surface comprised of a plurality of rollers, such as cylindrical rollers, which enable the pallet 21 with its cartons 22 to be easily rolled thereon in a substantially antifriction manner. Further, the weight of the pallet 21 and its cartons 22 may be generally sufficient or the stops 73 and 74 may include anchoring means even though antifriction rollers, or the like, are provided to prevent the load from shifting along the top surface 75 of the platform 37 during rotation of such platform.

As previously indicated, the nozzle assembly 41 is supported in a cantilevered manner on shaft 45 and the entire shaft 45 is suitably supported for substantially free pivoting movement on the base portion 36. The shaft 45 has an arm 77 fixed to its lower end portion as by welding, staking, utilizing suitable set screws or bolts, or any other suitable manner. An actuator 80 is provided for moving the arm 77 and hence the vertical shaft 45 and nozzle assembly 41 toward and away from the horizontal platform 37.

The actuator 80 comprises a cylinder portion 81 and a telescoping rod 82 extending outwardly therefrom and the cylinder 80 has an internal compression spring 83 provided therein which normally urges its telescoping rod 82 toward a retracted position. The telescoping rod 82 is fixed to the terminal outer end 85 of the arm 77 in any suitable manner and in this example of the invention rod 85 has a threaded outer end portion 86 which is threaded through a cooperating threaded opening 87 provided in the outer end portion 85 of arm 77. The opposite end of the actuator 80 is supported for pivoting movement about a pivot pin 88 which may be supported in a fixed position on an associated portion of the frame structure of the apparatus 35.

The actuator 80 in this exemplary embodiment of the invention is shown as a fluid actuator in which the operating fluid is air under regulated pressure. The air is provided to the rear face of a piston 89 comprising actuator 80 through a line 90 and from a suitable pressure source. The telescoping rod 82 is fixed to the front face of the above mentioned piston 89 and as pressure is applied to the rear face of the piston 89, rod 82 telescopes outwardly in a known manner.

Once it is desired to move the nozzle assembly 41 toward the horizontal platform 37 the cylinder 80 is actuated by energizing a solenoid actuated selector valve 92 connected in line 90 which allows pressurized air flow to the rear end of the cylinder 80 and against the rear face of piston 89 to extend rod 82 and pivot arm 77 and hence nozzle assembly 41 in a counterclockwise manner, as viewed in FIG. 1, toward the platform 37 and against the pallet 21 and its cartons 22. Once it is desired to return the nozzle assembly 41 to its original position the selector valve 92 is deenergized shutting off air flow to the actuator 80 whereupon the spring 83 urges the telescoping rod 82 within the cylinder 81 carrying with it the arm 77 to thereby pivot shaft 45 and nozzle assembly 41 in a clockwise manner, as viewed in FIG. 1, to move the nozzle assembly 41 away from the horizontal platform 37.

Reference is now made to FIGS. 1 and 16 of the drawings for a more detailed description of the nozzle assembly 41 with its nozzle portions or nozzles 42 and 43, as well as the associated structure comprising such nozzle assembly. In particular, it will be seen that the nozzle 42 has a substantially rectangular nozzle opening 95 which extends the full height of the nozzle 42 and enables heated air to be directed against the pallet 21 and its cartons 22 along substantially the full height thereof during rotation of such pallet and cartons and the platform 37. The nozzle 43 also has a substantially rectangular elongated opening 96 extending along the full length thereof and upon flowing heated air through the nozzle 43 the opening 96 directs heated air toward the top of the wrapped package 20 to enable heat shrinking of the plastic film 23 which originally projects in tubular form above cartons 22 against the top of such cartons.

In this example of the invention air is heated in a suitable heater and is forced by a blower, such as a centrifugal blower 100 having an electric drive motor 101, through a flexible conduit 102 to the nozzle assembly 41. The flexible conduit 102 assures that the nozzle assembly 41 may be pivoted without damage to the conduit 102 or assembly 41.

The heated air from the flexible conduit 102 is received in a tubular chamber 105 which communicates with the nozzle 42. The heated air from conduit 102 is conveyed to the nozzle 43 through a line 106 which has its entrance end connected to chamber 105 and its discharge connected to a conduit 107 which has an upper conduit portion 108 which telescopes within conduit 107. The upper portion 108 has another conduit 111 fastened in flow communication with its upper end and with the central portion of the nozzle 43 whereby heated air flows from conduit 102 and chamber 105 through the conduits 106, 107, 108 and 111 to the nozzle 43. The conduit portion 111 also serves as a supporting structure for the nozzle 43 and its housing 44B.

As seen particularly in FIG. 16 of the drawings, the nozzle 42 has a pair of converging side portions 113 and 114 arranged so that they converge toward their associated nozzle opening 95 to help impart a comparatively high velocity to the heated air exiting from the nozzle 42. In a similar manner, the nozzle 43 has a pair of side portions 115 and 116 which also converge toward its associated elongated rectangular opening 96 imparting a higher velocity to the heated air flowing out of the nozzle 43. Thus, upon actuating motor 101 to operate the blower 100, heated air air flows through the nozzle assembly 41 and exits the discharge openings 95 and 96 at comparatively high velocity so that it is directed against the package 20 to heat shrink the plastic film 23 thereagainst in an efficient manner.

The nozzle 43 is also vertically adjustable with respect to the horizontal platform 37 and in this exemplary embodiment of the invention a threaded set screw 120 is threaded through a threaded opening 121 in the conduit 107 and engages the telescoping conduit 108 to hold the conduit 108 and hence the nozzle 43 at any desired position above the horizontal platform 37. To change the position of the nozzle 43 it is a simple matter to loosen the set screw 120, slide the conduit 108 within conduit 107 until the desired vertical position is reached for nozzle 43, and then tighten the set screw 120 to rigidly fasten to nozzle 43 in position at the desired height.

The means illustrated in FIG. 16 for adjusting the height of nozzle 43 above platform 37 is of optimum simplicity and economy and it will be appreciated that any suitable means may be provided to adjust the vertical position of nozzle 43. For example, it may be desirable in some applications of this invention to provide a rack which is fixed to the nozzle housing structure 44A while suitably supporting a rotatable pinion on the telescoping conduit portion 108 for cooperation with the rack fixed to the housing 44A and such pinion may have a comparatively large knob operatively connected thereto, whereby it would be a simple matter to merely rotate the knob and hence the rotatable pinion to telescope the conduit 108 in and out of its conduit 107, as desired. Further, the frictional engagement provided between the rotatable pinion and associated rack of such an arrangement would normally be sufficient to hold the telescoping conduit 108 and its nozzle 43 in any desired vertical position without requiring additional latching means, or the like.

The apparatus 35 has a roller assembly 125, see FIG. 1, suitably fastened to the housing portion 44A adjacent the opening 95 in nozzle 42. The roller assembly 125 is provided to engage the package 20 during the process of heat shrinking the film 23 therearound and enable the platform 37 and package 20 to be rotated without damage to the nozzle assembly 41 and/or package 20. It will be appreciated that if the roller assembly 125 were not provided it might be possible for the package 20 and platform 37 to be snagged or caught against nozzle assembly 41 as discussed hereinafter.

During the heat shrinking cycle of the packaging operation the actuator 80 is actuated to extend its rod 82 and rotate the assembly 41 with a substantially constant force toward and against the package 20; however, the operation of actuator 80 is such that as the platform 37 is rotated and as each corner of package 20 is moved adjacent the roller assembly 125 it, in effect, overrides the actuating force of the actuator 80 causing its rod 82 to be momentarily pushed within the cylinder 81 yet the piston 89 of actuator 80 tends to continuously exert rod 82 outwardly with a substantially constant force. The net effect is to assure that the roller assembly 125 is held closely against the package 20 during the entire heat shrinking operation.

The roller assembly 125 of this example of the invention comprises a pair of substantially U-shaped brackets each designated by the same reference numeral 126 and the brackets 126 are fixed at the lower and upper end of the housing 44A in any suitable manner. The U-shaped brackets 126 support a pair of elongated cylindrical rollers 132 as will now be described.

Each bracket 126 has a pair of openings 130 adjacent the terminal ends of its outwardly extending legs and each opening 130 is adapted to receive an associated supporting shaft 131 extending from an associated end of a roller 132 whereby the brackets 126 support the rollers for free rotation.

The U-shaped brackets 126 support the cylindrical rollers 132 so that they extend outwardly of the terminal end of the nozzle 42 by an amount indicated at 134, see FIGS. 1 and 6. This construction assures that during complete rotation of the package 20 the terminal end of the nozzle 42 will not be urged against the film 23 to cause damage thereto while also assuring the nozzle 42 will not be caught against the package 20.

The apparatus or machine 35 has a master control switch designated generally by the numeral 138A in FIGS. 6 and 15 which connects such apparatus and its associated circuitry with main power lines $L_1$, $L_2$, and $L_3$ to supply electric power for operating such apparatus. In addition the apparatus has an emergency stop switch 138B. The apparatus 35 also has suitable control means to start and stop the rotation of the rotatable platform 37. In particular, a suitable start button 140 is provided to start the motor 66 and start rotation of the platform 37 with package 20 carried thereon as will be described subsequently. In addition, it will be seen that the brake 68 for stopping the platform is normally held actuated at all times that the platform is not rotating by a solenoid 141.

The apparatus 35 has a suitable limit switch 142 which is mounted in a fixed position on the base portion 36, see FIGS. 6 and 15. The limit switch 142 is adapted to be energized by an L-shaped member 143 extending beneath the lower portion of the platform 37 adjacent its outer periphery and the member 143 has a vertically extending arm 143A which has a controlled arcuate length. The limit switch 142 operates a control relay 150 which controls the motor 66 and hence rotation of shaft 65 and platform 37.

Once the platform 37 is rotated through one complete revolution, i.e., substantially 360°, the arm 143A strikes the telescoping pin 145 of limit switch 142 to stop rotation of the platform 37 by simultaneously deenergizing the motor 66 and energizing solenoid 141 and hence brake 68. The limit switch 142 is effective to stop rotation of the platform 37 after the completion of the wrapping cycle, i.e., overwrapping of the upper end portion of pallet 21 and its cartons 22 with the film 23, as well as at the completion of one complete revolution utilized during the heat shrinking cycle to heat shrink the plastic film 23 against the pallet 21 and cartons 22, and in a manner as will be described in detail subsequently in connection with the operation of the apparatus 35 and the associated electrical circuitry therefor.

Reference is now made to FIGS. 4–10 and 15 of the drawings for a detailed presentation of the apparatus and method of this invention as well as a detailed description of the electrical circuitry utilized which enables the apparatus 35 to be operated in a substantially semiautomatic manner.

As will be apparent particularly from FIG. 4 of the drawings, the apparatus 35 has a control panel 148 provided on the upper one of a pair of consoles each designated by the numeral 149 and arranged adjacent to the nozzle assembly 41.

An operator using the apparatus 35 would normally stand in front of the machine as viewed in FIG. 4, i.e., in position adjacent the lower left-hand corner of the drawing. Upon attaching the leading edge portion 24 of the plastic film 23 in position against the pallet 21 and cartons 22 the operator walks to the rear of the apparatus 35 to energize the appropriate control buttons provided on the control panel 148. This location of panel 148 is provided as a safety measure to move the operator away from the platform 37 during rotation thereof for either wrapping or heat-shrinking purposes; however, it is to be understood that the control panel 148 may be located at any desired location.

To operate the apparatus or machine 35 a pallet 21 with its cartons 22 is placed upon the horizontal platform 37. This may be achieved by placing such pallet and cartons on platform 37 as a unit or assembly 38. However, the pallet 21 may be placed on platform 37 first and then the individual cartons 22 may be suitably stacked in position, as desired. In any event, the pallet 21 is placed so that it engages the adjustable stops 73 and 74 provided on the platform 37.

The leading edge portion 24 of the plastic film 23 is adhesively fastened to the upper end portion 25 of the pallet 21 and to the carton 22 by applying the previously described rectangular strip of adhesive 31 vertically along the pallet and its cartons. The adhesive strip 31 is applied so that a width 32A thereof has the leading edge portion 24 fastened thereagainst and a width 32B thereof is adapted to have the trailing edge portion 30 of the film 23 adhesively fastened thereagainst, see FIG. 4.

With the leading edge portion 24 adhesively fastened to the adhesive strip 32 in the manner described above, the machine operator moves to the rear of the apparatus 35 and actuates the control button 140 which completes an electrical circuit to a control relay 150. The control relay 150 has a light 150A connected thereacross and mounted on the control panel 148 to indicate power is being supplied to such relay.

The operator momentarily holds the button 140 actuated until arm 143A of the limit switch contactor moves away from the limit switch 142.

The relay 150 has a plurality of normally open contacts 151, 152, 153, and 154 and normally closed contacts 155 and 156. The relay 150 actuates contacts 151–153 to energize the drive motor 66 while simultaneously energizing contacts 154, completing a holding circuit to the limit switch 142 to keep it actuated once arm 143A moves away from limit switch 142. The relay 150 also opens its contacts 155 deenergizing the solenoid 141 to simultaneously release the brake 68 as well as opening its contacts 156 to assure that even if a control button 160 provided to start the shrinking operation were to be inadvertently actuated the associated circuitry would not be energized to direct heated air toward the pallet 21 and its cartons 22 during the wrapping of the assembly 38 with plastic film 23.

The platform 37 rotates at a predetermined speed as determined by the characteristics of the motor 66 and the gear ratios provided in the gear box 67 and once the arm 143A is rotated through approximately 360° it automatically actuates the limit switch 142 breaking the circuit to the relay 150 stopping the motor 66 and causing contacts 155 to return to their normally closed position whereupon the brake 68 is immediately applied to stop rotation of the platform 37. As previously explained the rotation of the platform 37 also rotates the pallet 21 and its cartons 22 and inasmuch as the leading edge 24 of the film 23 is attached in position by adhesive strip 31, rotation of platform 37 causes film 23 to unwind from its supply roll 50 and be wound around the pallet 21 and its cartons 22. Once the 360° rotation is completed and the platform 37 is stopped by the brake 68 it will be seen that the overwrapped pallet 21 and its cartons 22 are in a position illustrated in FIGS. 7 and 8 of the drawings whereupon suitable means such as a knife edge 162 is used to cut the film 23 away from the package 20 and it will also be seen that the trailing edge portion 30 of that portion of the film used to overwrap the pallet 21 and cartons 20 is adhesively fastened against adhesive strip portion 32B and the resulting structure is in the form of a tubular outer film arranged with its central axis extending vertically.

The knife edge 162 is shown merely as an exemplary cutting edge which may be used by the operator of the machine 35. However, it will be appreciated that the knife edge 162 may be in the form of a suitable heated wire, or the like, which may be provided as part of the apparatus or machine 35 as an automatic cut-off device for the film 23.

As will be apparent from FIG. 8 of the drawings the height of the film 23 is matched to the overall height of the pallet 21 and its associated cartons 22 so that upon overwrapping the film 23 around such pallet and cartons the top edge of the film 23 extends above the top cartons 22 by a height indicated by the reference numeral 163. The upward extension 163 subsequently falls against the top surface of the top cartons 22 upon being heated and is effective in urging the cartons 22 toward the pallet 21 upon heat shrinking the film 23 against such pallet and cartons and in a manner as will be described in more detail subsequently. It will be appreciated that for a particular height package 20 the nozzle 43 is adjusted at the desired position above package 20 by loosening the set screw 120, telescoping conduit section 108 within the lower conduit section 107 to the desired position and then tightening the screw 120.

To start heat shrinking of the film 23 to define the completed overwrapped package 20 illustrated in FIG. 10, the machine operator moves to the rear portion of the machine and actuates and momentarily holds the shrink button 160 actuated causing the platform 37 to start rotating as will now be described so arm 143A again moves away from switch 142 and a light 165A provided on the control panel 148 is turned on indicating power is being supplied to a relay 165. The relay 165 has a plurality of normally open contacts designated by the reference numerals 166, 167, 168, 169, and 170 which are simultaneously closed and normally closed contacts 171 which are simultaneously opened. The push button 160 is a momentary push button control which returns to an open position once it is released. However, as the control button 160 is released a circuit to the control relay 165 is maintained through contacts 166, 167, and limit switch 142 which is now closed because arm 143A has rotated away therefrom.

Upon closing contacts 168 of relay 165 power is supplied to relay 150 to actuate the motor 66 and simultaneously release the brake 68 as previously described and it will be appreciated that this action takes place immediately to enable rotation of the platform 37 as previously described.

Actuating the control relay 165 also closes contacts 169 supplying power to the motor 101 for the blower 100 whereupon heated air is forced by the blower 100 through the conduit 102 and to the nozzle assembly 41 in the manner previously described. Actuating the control relay 165 also closes contacts 170 of such relay which energizes a solenoid 92A for the selector valve 92 associated with the actuator 80 and valve 92 allows air under pressure to flow through the line 90 to the actuator 80 to pivot the nozzle assembly 41 toward the platform 37 and package 20 while applying a substantially constant yielding force against arm 77.

Thus, it will be seen that the actuation of push button 160 simultaneously starts the platform 37 rotating, pivots the nozzle assembly 41 toward and against the package 20, and starts blower 100 causing heated air to be blown through the nozzle assembly 41 and impinged directly against the film 23 essentially as illustrated in FIG. 9 to thereby cause the film 23 to be tightly heat shrunk around the upper end portion of the pallet 21 and cartons 22 to define the completed package 20 as illustrated in FIG. 10 of the drawings. Once the heat shrinking action is completed the completed package 20 may be removed from the platform 37 in any suitable manner.

The shrinking of film 23 is such that it urges the cartons 22 firmly together and firmly against the pallet 21 so as to provide a unitary construction having high structural strength and rigidity and which is easily handled as a unit. In particular, it will be seen from FIG. 11 of the drawings, that the shrinking action is such that film shrinks between the spaces indicated at 175 between the cartons 22 to thereby provide a package construction having optimum rigidity. It will also be seen from the drawings that the film 23 is wrapped and heat shrunk only against the upper end portion 25 of the pallet 21 so as to prevent damage to such film in the event a fork lift truck is utilized to lift the completed package 20; however, it will be appreciated that in some applications of this invention it may be desirable to overwrap the entire pallet along its vertical surfaces and it would be a simple matter to rapidly and efficiently cut away that portion of the film 23 which extends beneath the upper portion 25 using a suitable instrument such as a heated knife edge, or the like, to enable easy handling of package 20 with a fork-lift truck without likelihood of starting to tear the film 23.

Thus, it is seen that a package assembly comprised of a pallet 21 and its cartons 22 are placed on the rotatable platform 37, a leading edge portion 24 of the plastic film 23 is adhesively fastened thereagainst. The horizontal platform 37 is then rotated about a vertical axis to thereby rotate the pallet 21 and cartons 22 and unwind a substantially rectangular strip of the film 23 from its supply roll 50 to tightly wrap the film around the pallet 21 and cartons 22 in a substantially tubular form. The trailing edge portion 30 of the film 23 is then adhesively attached or fastened in position adjacent the leading edge portion 24 and the film 23 is cut to define the rectangular strip and free the now overwrapped package 20 from the supply roll 50.

Suitable controls are actuated as previously described to start rotation of the platform 37 and simultaneously with the starting of rotation of platform 37 the nozzle assembly 41 is pivoted against the package 20 and heated air is directed against the vertical side walls and top of the package 20 to heat shrink the film 23 into position. Once a complete revolution has been made during the heat shrinking cycle the following actions take place automatically, the platform 37 stops, the nozzle assembly 41 returns to its normal position, and the centrifugal blower 100 is shut off.

It will be seen from the above description that the pallet 21 and cartons 22 are wrapped with only one layer of plastic film 23. However, it will be appreciated that the apparatus and method of this invention may be utilized with minor modifications thereto to overwrap such pallet and cartons with a plurality of layers of film 23 if desired.

The platform 37 illustrated in this example of the invention is shown as being supported on an antifriction bearing 63 adjacent the central portion of platform 37; however, it will be appreciated that the patform 37 may be suitably supported adjacent the outer periphery thereof on suitable bearings to provide improved strength and rigidity to enable the platform 37 to be utilized in carrying comparatively larger loads.

It has also been described in this specification that the centrifugal blower 100 is utilized to provide air from a suitable source in which the air is heated. However, it is to be understood that it is entirely within the scope of this invention to provide heaters such as electrical resistance heaters, for example, suitably mounted within the housing portions 44A and 44B and such resistance heaters may be turned on during the shrink cycle whereupon the blower 100 would in effect supply cool air to the housing portions 44A and 44B which would be heated by the electrical resistance heaters so that heated air would be discharged from the nozzle 42 and 43 in a similar manner as described previously in connection with the air being heated at another location and supplied by the blower 100 to the assembly 41.

It may also be desired to provide a top covering for the improved package 20 to assure that the cartons 22 are contained in a sealed substantially dust-proof enclosure. FIG. 16 illustrates a perspective view of another exemplary package of this invention wherein a top covering in the form of a sheet 177 may be draped over the upper cartons 22 prior to wrapping the film 23 in position. Upon wrapping such film 23 in position and heat shrinking in a manner previously described in detail, it will be seen that the top of the resulting package, which will now be designated generally by the reference numeral 20A, is protected in a substantially dust-proof manner.

The plastic film 23 is preferably a transparent plastic film which enables the cartons 22 to be easily visible therethrough. It will be appreciated that each of the cartons will have suitable identification and/or advertising material thereon whereupon the improved unitary package 20 has high structural strength and rigidity and need not be provided with advertising or identification inasmuch as such advertising and/or identification is provided on the individual cartons 22.

It was previously described in connection with the package 20 and the embodiment thereof illustrated in FIG. 13 of the drawings, that pressure sensitive tape 33 or an elongated paperboard strip may be utilized instead of the adhesive 31. It will be appreciated that in utilizing such pressure sensitive tape or paperboard strip the apparatus and method of this invention may still be effectively used essentially in the manner described above.

The plastic film 23 which may be utilized to overwrap the pallet 21 and the cartons 22 may be any suitable transparent plastic film which will undergo shrinkage when subjected to heat. It will also be appreciated that the temperature and volume of the heated air supplied to the package 20 to enable the plastic film to be accurately shrunk therearound may be controlled in any suitable manner.

In this disclosure of the invention the package 20 is shown as being comprised of a pallet 21 and a plurality of cartons 22 supported on such pallet with the plastic film 23 wrapped therearound; however, it is to be understood that it may be desirable to support only one carton or container on the pallet 21 in some applications of this invention.

While present exemplary embodiments of this invention, and methods of practicing the same, have been illustrated and described, it will be recognized that this invention may be otherwise variously embodied and practiced by those skilled in the art.

What is claimed is:

1. An apparatus for overwrapping packages comprising, a rotatable support for supporting a package, a drive for rotating said support, said support being rotatable about a fixed axis of rotation to enable wrapping a heat-shrinkable plastic film against said package, a spindle for supporting a supply roll of said film for unwinding rotation thereabout and in spaced apart relation from said support, said film being easily initially unrolled from said supply roll to attach a leading edge portion thereof against said package, said film being unwound from said supply roll and simultaneously wrapped in tubular form against said package by actuating said drive to rotate said support and package and using said package pulling against said film to unwind and wrap said film in position, and a device for heating said film causing it to shrink against said package and provide a compact and easily handled unit, said support and package and said heating device being relatively rotatable to enable heat shrinking of said film against said package, said heating device being supported for movement toward and away from said support and package during relative rotation to enable control of the distance between said heating device and film to provide a more efficient heat shrinking of said film.

2. An apparatus as set forth in claim 1 in which said heating device comprises a nozzle assembly for directing heated air uniformly against said film and package overwrapped thereby along a zone of narrow width which extends substantially the full vertical height of said film and package.

3. An apparatus for overwrapping a package comprising, a rotatable support for supporting said package, said support comprising a horizontally arranged platform and said support being rotatable about a fixed vertical axis of rotation through the central portion of said platform to enable wrapping a heat-shrinkable plastic film around said package, a device for heating said film causing it to shrink against said package and provide a compact and easily handled unit, said heating device comprising a nozzle assembly for directing heated air against said film and package overwrapped thereby, a drive for rotating said platform, a spindle for supporting a supply roll of said film for unwinding rotation thereabout and in spaced apart relation from said platform, said film being easily initially unrolled from said supply roll to attach a leading edge portion thereof substantially vertically along said package and upon actuating said drive said film is automatically unwrapped from said supply roll and around said package to form a tubular sleeve therearound, said drive comprising a drive motor, a switch device for determining the angular rotation of said platform, a brake for stopping said platform, and a control system operatively connected to said drive motor, switch device and brake to enable rotation of said platform and automatic stopping thereof once the required amount of said film has been wrapped around said package.

4. An apparatus as set forth in claim 1 in which said heating device comprises a nozzle assembly for directing heated air against said film and package overwrapped thereby during said relative rotation, said nozzle assembly comprising a first nozzle for supplying heated air directed toward said film and package and in a stream of narrow width which extends substantially the full height of said package and a second nozzle for supplying heated air directed toward the top of said package.

5. An apparatus as set forth in claim 4 in which said nozzle assembly is supported for pivoting movement toward and away from said support and package, said spindle is supported substantially vertically on an associated structure which supports said supply roll so that a portion of said film extends above the top of said package and upon attaching a leading edge portion thereof against said package and actuating said drive to rotate said support and package said film is wrapped so that it has a substantially tubular extension extending above the top of said package, and said heated air from said second nozzle heat shrinks said tubular extension tightly against the top of said package.

6. An apparatus for overwrapping a package comprising, a rotatable support for supporting said package, said support comprising a horizontally arranged platform and said support being rotatable about a fixed vertical axis of rotation through the central portion of said platform to enable wrapping a heat-shrinkable plastic film around said package, a device for heating said film causing it to shrink against said package and provide a compact and easily handled unit, said heating device comprising a nozzle assembly for directing heated air against said film and package overwrapped thereby, said nozzle assembly comprising a pivotally mounted nozzle assembly supported for pivoting movement toward and away from said package and platform, a drive for rotating said platform, a spindle for supporting a supply roll of said film for unwinding rotation thereabout and in spaced apart relation from said platform, said film being easily initially unrolled from said supply roll to attach a leading edge portion thereof substantially vertically along said package and upon actuating said drive said film is automatically unwrapped from said supply roll and around said package to form a tubular sleeve therearound, and an actuator for actuating said nozzle assembly toward said package and yieldingly holding said nozzle assembly thereagainst to impinge heated air substantially directly on said film and package and provide a more efficient heat shrinking of said film, said actuator being easily overridden by forces imposed thereagainst by said package during rotation thereof whereby said nozzle assembly moves toward and away from said package closely following its contour during the heat shrinking of said film.

7. An apparatus as set forth in claim 6 in which said drive comprises a drive motor and further comprising, a switch device for determining the angular rotation of said platform, a brake for stopping said platform, a blower operatively connected to said nozzle assembly to force heated air therethrough, and control means operatively connecting said blower, actuator, drive motor, and switch to enable heated air to be impinged against the plastic film overwrapped around said package while rotating said package and said platform and providing automatic shut-off of all components to terminate the heat shrinking action and cause said brake to stop said platform.

8. An apparatus as set forth in claim 6 in which said nozzle assembly comprises a first nozzle for directing heated air along the full height of said package during rotation of said platform and said apparatus further comprising a roller assembly fastened to said first nozzle assembly adjacent the terminal end thereof said roller assembly having at least one roller which engages said package and enables said nozzle assembly to be held tightly against said package by said actuator during rotation thereof while permitting said package to be rotated with minimum likelihood of snagging against said nozzle assembly.

9. An apparatus as set forth in claim 1 and further comprising a friction brake mounted on said spindle and adapted to be engaged by said supply roll of plastic film to assure that said plastic film is unwound from said supply roll under a predetermined substantially constant tension to provide a comparatively tight wrap against said package prior to heat shrinking of said film in position thereagainst.

10. An apparatus as set forth in claim 1 and further comprising a vertical shaft supporting said heating device in a cantilevered manner, said shaft being easily rotated to enable said heating device to be easily pivoted toward and away from said support and package.

11. An apparatus for overwrapping a package comprising, a rotatable support for supporting said package, a drive for rotating said support, said support being rotatable about a fixed axis of rotation to enable wrapping a heat-shrinkable plastic film against said package, a spindle for supporting a supply roll of said film for unwinding rotation thereabout and in spaced apart relation from said support, said film being easily initially unrolled from said supply roll to attach a leading edge portion thereof against said package, said film being unwound from said supply roll and simultaneously wrapped in tubular form against said package by actuating said drive to rotate said support end package, a device for heating said film causing it to shrink against said package and provide a compact and easily handled unit, said heating device being supported on an associated structure for pivoting movement toward and away from said support and package, and a roller device rotatably supported on said structure, said roller device being adapted to be held against said overwrapped film and package during rotation of said support and package past said heating device with said roller device serving to control the distance between said heating device and film to provide a more efficient heat shrinking of said film.

12. An apparatus for overwrapping a package comprising, a rotatable support for supporting said package, a drive for rotating said support, said support being rotatable about a fixed axis of rotation to enable wrapping a heat-shrinkable plastic film against said package, a spindle for supporting a supply roll of said film for unwinding rotation thereabout and in spaced apart relation from said support, said film being easily initially unrolled from said supply roll to attach a leading edge portion thereof against said package, said film being unwound from said supply roll and simultaneously wrapped in tubular form against said package by actuating said drive to rotate said support and package, a device for heating said film causing it to shrink against said package and provide a compact and easily handled unit, said heating device being supported on an associated structure for pivoting movement toward and away from said support and package, a roller device rotatably supported on said structure, and an actuator for actuating said structure toward said package and yieldingly holding said roller device against said package to hold said heating device closely adjacent said film and package and provide a more efficient heat shrinking of said film, said actuator being easily overridden by forces imposed against said roller device by said package during rotation thereof whereby said heating device moves toward and away from said package closely following its contour during the heat shrinking of said film.

13. An apparatus as set forth in claim 12 in which said actuator comprises an air cylinder supplied with air under regulated pressure, said air pressure being easily regulated to enable precise control of the force with which said roller device is held against said package.

14. An apparatus as set forth in claim 4 in which said first nozzle comprises a pair of converging side portions which define their associated nozzle opening and impart a comparatively high velocity to the heated air flowing through said opening, said high velocity air providing a more efficient heat shrinking of said plastic film.

15. An apparatus as set forth in claim 1 and further comprising means for severing said film upon wrapping thereof in said tubular form around said package to define a trailing edge portion of said film which is attached in position adjacent said leading edge portion prior to said heat shrinking.

16. An apparatus for overwrapping packages comprising, a rotatable support for supporting a package, a drive for rotating said support, said support being rotatable about a fixed axis of rotation to enable wrapping a heat-shrinkable overwrapping material against said package, a spindle for supporting a supply roll of said material for unwinding rotation thereabout and in spaced apart relation from said support, said material being easily initially unrolled from said supply roll to attach a leading edge portion thereof against said package, said material being unwound from said supply roll and simultaneously wrapped in tubular form against said package by actuating said drive to rotate said support and package and using said package pulling against said material to unwind and wrap said material in position, and a device for heating said material causing it to shrink against said package and provide a compact and easily handled unit, said support and package being rotatable about said fixed axis past said heating device to enable heat shrinking of said material against said package, said heating device being supported for movement toward and away from said support and package so that during rotation of said support and package past said heating device the distance between said heating device and material is controlled to provide a more efficient heat shrinking of said material.

References Cited

UNITED STATES PATENTS

| | | | |
|---|---|---|---|
| 2,633,251 | 3/1953 | Bruce | 53—162 X |
| 2,813,638 | 11/1957 | Miller | 53—162 X |
| 2,878,628 | 3/1959 | Curry | 53—30 |
| 3,037,336 | 6/1962 | Hoffmann | 53—212 |
| 3,099,115 | 7/1963 | McKibben | 53—184 X |
| 3,126,682 | 3/1964 | Krance | 53—30 |
| 3,324,625 | 6/1967 | Dulmage | 53—30 X |
| 3,348,356 | 10/1967 | Curtis | 53—30 |
| 3,404,508 | 10/1968 | Dreyfus | 53—30 X |
| 3,430,358 | 3/1969 | Denker | 53—184 X |
| 3,429,095 | 2/1969 | Huson | 53—24 |
| 3,436,895 | 4/1969 | Pearne | 53—214 |

FOREIGN PATENTS 667,862   3/1952   Great Britain.

WAYNE A. MORSE, Jr., Primary Examiner

U.S. Cl. X.R.

53—26, 184, 214